United States Patent [19]

Woods

[11] 3,849,105
[45] Nov. 19, 1974

[54] GRANULAR PESTICIDE
[76] Inventor: Verle W. Woods, P.O. Box 1016, Yakima, Wash. 98901
[22] Filed: Jan. 21, 1970
[21] Appl. No.: 4,771

Related U.S. Application Data
[63] Continuation-in-part of Ser. No. 629,102, April 7, 1967, abandoned.

[52] U.S. Cl. .................. 71/65, 71/79, 71/DIG. 1, 424/357, 424/358
[51] Int. Cl. ...................... A01n 19/00, A01n 5/00
[58] Field of Search ........... 71/DIG. 1, 65; 424/357, 424/359

[56] References Cited
UNITED STATES PATENTS

| | | | |
|---|---|---|---|
| 2,957,803 | 10/1960 | Woods | 71/DIG. 1 |
| 3,083,089 | 3/1963 | Renner | 71/97 |
| 3,137,618 | 6/1964 | Pearce | 71/DIG. 1 |
| 3,160,494 | 12/1964 | Duyfjes | 71/DIG. 1 |
| 3,184,380 | 5/1965 | Woods | 71/DIG. 1 |
| 3,362,810 | 1/1968 | Deming | 71/DIG. 1 |
| 3,585,022 | 6/1971 | Gray, Jr. | 71/DIG. 1 |
| 3,617,095 | 11/1971 | Lissant | 71/DIG. 1 |
| 3,708,573 | 1/1973 | Yoshinaga et al. | 71/79 |

OTHER PUBLICATIONS
Chemical and Engineering News, Oct. 31, 1955, page 4690.

*Primary Examiner*—James O. Thomas, Jr.
*Attorney, Agent, or Firm*—Wells, St. John & Roberts

[57] ABSTRACT

This disclosure is concerned with a method of producing a granular pesticide for soil application purposes, utilizing an oleaginous suspension of a solid, water-insoluble pesticide sprayed upon a granular absorbent carrier. It also relates to the granular product obtained by use of the method. The process involves the mixing of the pesticide suspension with water to form a sprayable suspension in which the water is the continuous phase. This suspension is then sprayed onto the surfaces of a free-flowing absorbent carrier such as attapulgite. The sprayed carrier is then permitted to cure while at rest, during which time the water will be absorbed from the surface suspension and an oleaginous coating will adhere to the surfaces of the granular carrier particles. As the water is absorbed into each particle, the suspension sprayed on it will invert and the oleaginous component will become the continuous phase of the surface suspension. The oleaginous component will slightly penetrate the surface of each particle and adhere the suspended pesticide to the wetted particle surface.

6 Claims, No Drawings

GRANULAR PESTICIDE

CROSS-REFERENCE TO OTHER APPLICATIONS

This is a continuation-in-part of U.S. application Ser. No. 629,102, filed April 7, 1967, and abandoned in favor of the present application.

BACKGROUND OF THE INVENTION

This disclosure is directed to the formulation of a solid granular pesticide product for soil application. Granular pesticide formulations are advisable under certain conditions where the application of the pesticide to the soil is required without adherence to plant surfaces. For certain applications of pesticides, such granular compositions are preferred, since they reach the crown of plants or soil more readily than do dusts or sprays, and because they are easily mixed with soil and more readily handled and controlled during application.

Various techniques have previously been employed in the production of granular pesticides. A discussion of such techniques can be found in U.S. Pat. No. 3,137,618, which itself is concerned with the preparation of a granular pesticide, starting with a liquid pesticide. It describes prior methods where liquid pesticide is sprayed onto absorbent granules and is absorbed to the interior of the granules. In another method, the liquid pesticide is blended with an absorbent dust and rolled onto particles of sand. Another patent in this general area is U.S. Pat. No. 3,160,494, directed to the production of granular pesticides using coffee grounds as a carrier. The pesticide is applied in the form of a suspension that is not absorbed into the carrier.

As evidenced in particular by the two above patents, prior production techniques for manufacturing granular pesticides fall into two general categories. First is a simple coating of carrier granules to enlarge the bulk of the granules and eliminate absorption of the pesticide into the granules themselves. Second is a pure absorption system wherein the pesticide in solution is absorbed into the carrier granules. The first of these often results in a relatively dry product and the coated pesticide material is often rubbed from the carrier particles before normal use. The second involves the recognized problem of absorption of the pesticide within the carrier granules, where it is not readily available for active use. this As opposed to the methods and resulting products developed by these prior efforts, the present disclosure has been found to result in improved adherence of the pesticide coating to the carrier granules without absorption of the pesticide into the granular structure. By use of the particular type of suspension sprayed onto absorbent particles, theis development results in a somewhat humid particle coated by an oily pesticide substance. The absorption of water and inversion of the suspension as described below results in a coated granular formulation that is particularly stable and which remains in its desired granular state until used.

SUMMARY OF THE INVENTION

The invention described below relates to a method of making a granular pesticide for soil application and to the resulting product. The method involves the preparation of an oleaginous suspension of a solid, water-insoluble pesticide dispersed in a continuous water phase. The suspension is sprayed onto particles of a water absorbent carrier to coat the carrier surfaces with the suspension. As the particles cure at rest, the bulk of the water in the suspension is absorbed into the carrier structure. As this occurs, the surface suspension remaining on the particles will invert and the oleaginous component of the suspension will become the continuous phase. After inversion, a portion of the oleaginous component will be absorbed into the surface of each particle, securely adhering the oily remaining suspension and entrapped pesticide to the individual particle surfaces. The pesticide is available at the surface of the granules for absorption into the soil moisture.

One object of the invention is to provide a practical method of making a granular pesticide formulation from a stable liquid suspension of a solid water-insoluble pesticide. The resulting granular formulation provides improved control of pesticide distribution and strength, and can be obtained with uniformity in the resulting almost-dry, solid product.

Another object of the invention is to provide a process for forming a granular pesticide wherein the size of the granules can be easily controlled by selecting the proper size of the starting carrier particles. The process does not cause the particles to adhere to one another during the addition of the pesticide.

These and further objects will be evident from the following disclosure, which describes a preferred form of the method and the resulting pesticide formulations.

DESCRIPTION OF THE PREFERRED EMBODIMENT

The present disclosure relates to a process of preparing granular formulations of water-insoluble chemical pesticides. It is particularly applicable to such chemicals used as insecticides, acaricides, herbicides and fungicides. In particular, the invention is concerned with the production of granular formulations of solid organic pesticides. By a solid pesticide is meant a pesticide chemical which is in the solid state at ordinary temperatures (below 30° C.) in its ordinary technical form.

In U.S. Pat. No. 2,957,803, titled "Method of Preparing Suspensions of Insecticides," there is disclosed a method of preparing suspensions of such solid pesticide chemicals. The solid materials are dispersed in a carrier fluid by a recirculation process wherein the solid particles are coated by an oleaginous substance (fat or oil of animal, vegetable or mineral origin) and uniformly dispersed through the liquid as an emulsion. An improvement in this process for preparing suspensions of particular pesticides is described in U.S. Pat. No. 3,184,380, titled "Stabilization of Concentrated Suspensions of Pesticide Particles." Suspensions produced by either of the disclosed methods may be utilized as starting materials for the present method. Other processes of preparing suspensions of pesticide particles can be used, so long as the resulting suspension is an oily or oleaginous suspension of the pesticide emulsion in water, the water constituting the continuous phase of the suspension.

The following water-insoluble solid pesticides have characteristics that fit them for the processes of preparing suspensions according to one or both of the above patent disclosures, the more stable suspension produced by the method of U.S. Pat. No. 3,184,380 being preferable when applicable to the material:

Insecticides and Acaricides
  Dichloro diphenyl trichloroethane (DDT)
  1,2,3,4,10,10,-hexachloro-1,4,4a,5,8,8a-hexahydro-1m4-endo-exo-5,8-dimethanonaphthene (Aldrin)
  1,2,3,4,5,6-hexachlorocyclohexane (Benzene Hexachloride)
  Calcium Arsenate
  Cryolite
  Methoxychlor
  1,1-dichloro-2,2-bis (p-chlorophenyl) ethane (DDD)

1,2,3,4,10,10-hexachloro-6,7-epoxy-1,4,4a,5,6,7,8,8a-octahydro-1,4-endo,exo-4,8-dimethanonaphthalene (Dieldrin)
  1,2,3,4,10,10-hexachloro-6,7,-epoxy-1,4,4a,5,6,7,8,8a-octahydro-1,4,-endo,endo-5,8-dimethanonaphthalene (Endrin)
  1-naphthyl n-methylcarbamate (Carbaryl)
  2,4,5,4'-tetrachlorodiphenyl sulfone (Tetradifon)
Herbicides
  2,4,-dichlorophenoxyacetic acid (2,4-D acid) (and its salts and esters).
  Isopropyl n-phenyl carbamate (IPC)
  2,4,5-trichlorophenoxyacetic acid (2,4,5-T acid) (and its salts and esters).
Fungicides
  Zinc dimethyl dithiocarbamate (Ziram)
  N-trichloromethylmercapto-4-cyclohexene-1:2-dicarboximide (Captan)
  Copper carbonate
  Streptomycin
  Tetramethyl thiuram disulfide (Thiram)
  Zinc ethylene bisdithiocarbamate (Zineb)
  Manganous ethylene bisdithiocarbamate (Maneb)
  Ferric dimethyl dithiocarbamate (Fermate)
Rodenticides
  1,2,3,4,10,10-hexachloro-6,7-epoxy-1,4,4a,5,6,7,8,8a-octahydro-1,4,-endo-endo-5,8-dimethanonaphthalene (Endrin)
Growth regulators and Chemical thinners
  Naphthalene acetic acid (NAA)
  2,4,5-trichlorophenoxypropionic acid (2,4,5-TP)
  1-naphthyl n-methylcarbamate (Carbaryl)
  Succinic acid 2,2-dimethyl hydrazide (Alar)
  6-hydroxy-3-(2H)- pyridazinone (Maleic Hydrazide)

Agricultural Molluskicides
  Metaldehyde

To produce a stable suspension of the above chemical pesticides according to the teachings of U.S. Pat. No. 2,957,803, the first step is to break up the chemical solids to a coarse granular form that can be circulated. The solid materials are then further reduced to the desired fineness by first preparing a liquid base made by mixing with water a suitable oleaginous component which can be any fat or oil of animal, mineral or vegetable origin which will not react with the pesticide and in which the pesticide is relatively insoluble. Examples of the oleaginous component are lard, tallow, mineral oil, margarine or a combination of these or similar materials. Also added to the water is a water-soluble substance that increases the specific gravity of the resultant liquid and which has no particular reaction with the oleaginous component. Urea, sugar, sulfite waste liquor from the paper and pulp industry or other water soluble substances having these properties can be used. Urea is relatively inexpensive and is non-toxic to plants, and is a preferred ingredient for increasing the specific gravity. However, this disclosure is not to be limited exclusively to the use of urea for this purpose. The oleaginous component and the water-urea solution are mixed together to form a smooth emulsion. It is desirable to use a suitable emulsifying agent to aid in making the emulsion. Many chemical emulsifiers may be used. Examples are "Triton X 45" and "Triton X 155" made and sold by Rohm and Haas of Philadelphia, Pennsylvania. Other examples are "Witco 300" and "Witco 500" made and sold by the Witco Chemical Company of Los Angeles, California. Another emulsifier is "Sponto 217" and "Sponto 221" made and sold by the Retzloff Chemical Company. Emulsifiers commercially available from other sources can be substituted for those specifically mentioned. The solid pesticide particles are broken up or ground to the desired fineness while being circulated or pumped in the emulsion. In this way the particles of solid pesticide are brought into contact with the globules of the oleaginous component in the emulsion and become coated. The coating of oleaginous material overcomes the natural tendency of the solid pesticide particles to adhere to one another and acts as a floating agent to maintain the particles in a stable suspended condition.

A further refinement of this method of preparing suspensions is found in the disclosure of U.S. Pat. No. 3,184,380. This disclosure relates to a more uniform suspension of certain chemical pesticides which have a solid crystalline in the normal range of temperatures at which they are stored and used and also have melting points below their decomposition temperatures and below the boiling point of the suspending solution or are substantially soluble in the oleaginous coating below the boiling point of the suspending liquid and below the decomposition temperatures. After preparation of the suspension as described above, the temperature of the suspension is raised until the solid pesticide either melts or is dissolved in the oleaginous component of the suspension. This rise in temperature is accompanied by continuous agitation. After melting or being dissolved, the chemical pesticide is recrystalized by cooling, meanwhile continuing the agitation of the suspension. The recrystalization produces an improved uniformity of the solid pesticide in the suspension, resulting in greater stability for those suspensions of pesticides amenable to this process.

Temporary suspensions can also be utilized in the preparation of granular pesticide formulations according to this disclosure. Such suspensions must be an oleaginous-water-emulsifier-pesticide combination with the oleaginous component being not less than one-third the amount of pesticide by weight or more than equal by weight to the pesticide in the suspension. The balance of the suspension is its water component plus adequate amounts of a suitable emulsifier to form an emulsion. The oleaginous component must be of a type that will not dissolve appreciable amounts of the solid pesticide.

The granular carrier utilized in this method of producing a granular pesticide formulation can be chosen from a group of suitable water absorbent minerals or clay inert to the pesticide chemical or from available synthetic materials. The carrier particles must be adequately absorbent to draw water through the particle surfaces to cause the suspension on the particle surfaces to invert. When applied to the particles, the oleaginous suspension has water as the continuous phase of the suspension. After absorption of the water into the carrier particles, the oleaginous component becomes the continuous phase of the remaining surface suspension.

The following is a list of exemplary carrier substances suitable for use in the present method, including trade names and material sources. It is not intended to be exhaustive, but should serve as a typical list of available resources with which other alternative materials can be compared.

Suitable granular absorbent carriers are selected from granular forms of mineral clays, such as attapulgite (available as "Florex" from the Floridin Company, of New York or as "Attaclay" from the Attapulguous Clay Company, of Philadelphia, Pennsylvania), kaolin, bentonite, montmorillonite; absorbent mineral substances such as "Megsite" sold by Waverly Petroleum Products Company of Philadelphia, Pennsylvania, diatomaceous earth or diatomite and natural or synthetic granular carriers composed of silicon dioxide, magnesium carbonate, calcium silicates, or aluminum silicates, as examples. This list is not intended to be all-inclusive, since many available granular materials can be used and selected from available clays, minerals and synthetic substances inert to the components of the pesticide composition.

Besides the examples listed above, carrier materials generally recognized as having medium to high absorbent characteristics can be used as the base granular particle material in the present production method. However, it is necessary that the carrier material be capable of absorbing the required amount of liquid to invert the suspension on its surfaces while remaining pourable and free flowing. The greater the ability of the carrier to absorb the liquids, the faster the process of preparing the granular pesticide formulation. It is best to choose an absorbent carrier with as high absorption characteristics as is available. Furthermore, where a high pesticide analysis is required in the final granular product, a higher degree of absorbency will be required in the carrier, since it must be utilized in a smaller proportion to the active pesticide and the suspension liquids. I have found it best to use carriers capable of absorbing at least three times the liquids necessarily absorbed during the process.

To carry out the method, one begins with an oily suspension of the solid pesticide prepared according to one of the two prior patent disclosures mentioned above or a temporary suspension using an oleaginous-water-emulsifier-pesticide combination as set out above. One must normally first add additional water to the suspension in an amount necessary to make the suspension sprayable. At this point, if not before, the water in the suspension constitutes the continuous phase of the suspension. The amount of water added to make the suspension sprayable will vary depending upon the type of spray equipment being utilized.

The oily suspension of solid pesticide emulsion in water is then sprayed into a tumbling drum containing the selected carrier particles. The size of the particles is chosen to conform to the desired size of the finished granular pesticide formulation. Particles having a size from 16 to 20 mesh are used herein as an example, but the particle sizes can be larger or smaller than this range. The particles are constantly tumbled in the drum during spraying of the suspension. The tumbling action causes the particles to rub against one another and makes the coating of the particles as uniform as possible.

Tumbling of the particles is terminated immediately at the conclusion of the spraying step, and the particles are then permitted to cure for a few hours at rest. The coated particles can then be stored in a closed bin or container until used. Weight loss and unnecessary drying of the particle surfaces is avoided by sealing the granular pesticide in a container or package. The resulting particles have a somewhat damp and oily surface coating. Any mechanical mixing of the particles after being coated should be avoided, since this will cause the coating to be built up on some particles and to be removed from others.

This process has been utilized to prepare coatings of particles wherein the resulting granular product contains up to 15 percent of the active pesticide chemical. It is particularly adapted for the production of granular pesticides for soil application purposes such as between rows of a crop. The granular pesticide can be applied to a field by airplane or by surface equipment during planting operations. Drift of the material is minimized when applied by airplane, since the rather large solid particles fall downwardly under close control. The particles can be plowed into the soil during normal cultivation. The coated particles maintain the active pesticide ingredient on their surfaces in the oily coating, where it is available for absorption into the soil moisture to combat soil insects, diseases, weeds, etc., depending upon the nature of the pesticide ingredient and purpose of the pesticide application.

The following examples of specific granular pesticide formulations are set out to exemplify the choices of materials and active pesticides. They are not intended to limit the scope of the disclosure. Other pesticides and liquid materials can be substituted in place of those specified below, depending upon the strength and choice of pesticide necessary for a particular application.

EXAMPLE 1

To prepare a one thousand pound batch of granular insecticide containing 10 percent DDT, one begins with a 250 lb. quantity of 40 percent DDT suspended in water in an oleaginous suspension. The suspension is prepared according to the method set out in U.S. Pat. No. 2,957,803, referring specifically to "Example 2" therein. The starting materials are 210 gallons (1,750 lbs.) of water, 185 lbs. of commercial emulsifier, 160 lbs. of urea and 520 lbs. of lard, making a total weight of 2,615 lbs. A 40 percent DDT suspension is made by agitating the components with 1,740 lbs. of DDT, thereby producing 4,355 lbs. of the 40 percent suspension.

A 250 lb. quantity of the 40 percent suspension of DDT is first mixed with an additional 100 lbs. of water so as to be sprayable. The water constitutes the continuous phase of the suspension. The suspension is then sprayed onto 650 lbs. of an absorbent carrier having particle sizes of the desired range. An example is attapulgite having particle sizes from 16 to 20 mesh inclusive. The 250 lb. quantity of suspension contains 100 lbs. of DDT, producing the desired 10 percent ratio of DDT in the finished granular formulation.

The carrier material is constantly tumbled during the spray application of the suspension, and the rate of spraying is as rapid as the suspension can be accepted by the carrier particles. After the entire quantity of the suspension has been sprayed onto the particles, tumbling is immediately terminated and the product is transferred to a curing bin without further blending. It is permitted to remain at rest and to cure for a few hours and is subsequently stored without mixing.

EXAMPLE 2

A suspension of metaldehyde is produced according to Example 1 in U.S. Pat. No. 2,957,803. The starting materials are 90 gallons of water, 5½ gallons of commercial emulsifier, 80 lbs. of urea and 150 lbs. of lard. These materials are agitated along with the addition of 1,080 lbs. of granular metaldehyde. This results in an oily emulsion containing by weight over half of the active ingredient (metaldehyde). To produce a granular formulation, the suspension is diluted with additional water so as to be sprayable and applied onto an amount of granular carrier material selected so as to result in the desired percentage of active pesticide in the final granular product.

EXAMPLE 3

A suspension of aldrin is made using the same procedures as in Examples 1 and 2, starting with 1,000 lbs. of aldrin, 5½ gallons of emulsifier, 150 lbs. of lard, 80 lbs. of urea and 90 gallons of water. The suspension is diluted by the further addition of water and applied to a suitable absorbent carrier.

Example 4

The suspensions set out in Examples 1 through 3 are prepared using vegetable fat (margarine) in place of lard, the proportions and other ingredients being identical to those described above.

EXAMPLE 5

The suspensions described in Examples 1 through 3 are prepared with mineral oil in place of lard, the proportions and other ingredients being identical to those set out above.

EXAMPLE 6

The suspensions set out in Examples 1 through 5 are prepared by substitution of sugars or sulfite waste liquor from the paper and pulp industry in place of the specified urea. Specifically, dried sulfite waste liquor equal to the amount of urea specified above has been found to produce a stable suspension.

EXAMPLE 7

The starting emulsion can also be produced according to the methods of U.S. Pat. No 3,184,380. The DDT suspension set out in Example 1 can be treated according to this method by heating the suspension until the oleaginous component of the suspension dissolves the DDT particles, then gradually cooling the suspension during agitation to recrystallize the coated DDT. The granular pesticide formulation is then produced by adding additional water and spraying the oily suspension onto a suitable selected carrier.

EXAMPLE 8

A temporary suspension can be produced by using the following desirable combination of basic suspension elements:

pesticide — 40 percent by weight
oleaginous component — 25 percent by weight
water — 32 percent by weight
commercial emulsifier — 3 percent by weight.

As an example of the commercial emulsifier, a mixture containing 50 percent Witco 300 and 50 percent Witco 500 (Witco Chemical Company, Los Angeles, California) has been found to be satisfactory. Again, the suspension is diluted so as to make it sprayable and is then sprayed upon the particles of a suitable carrier.

EXAMPLE 9

When using a temporary suspension, the limitations set out above are that the oleaginous component must not be less than one-third the amount of the pesticide by weight or more than equal by weight to the pesticide in the suspension. Thus the limits are as follows:

pesticide — 40 percent by weight
mineral oil — 13 ⅓ percent by weight to 40 percent by weight
water — 43 ⅔ percent by weight to 17 percent by weight
commercial emulsifier — 3 percent by weight.

The amount of emulsifier must be that amount suitable to form an emulsion, using available information from the manufacturer.

After the particles of the carrier material are sprayed, each particle absorbs a quantity of water from the continuous phase of the suspension applied thereto. As this water is drawn inwardly from the particle surfaces, it leaves on the surfaces the oleaginous component of the suspension plus the suspended active pesticide ingredient. The absorption of water continues until the surface suspension inverts, whereby the oleaginous component becomes the continuous phase of the surface suspension. After this occurs, a slight amount of the oleaginous component will then be absorbed into the particles adjacent to the particle surfaces, securely adhering the oily remaining suspension to each particle. The particles should not be permitted to dry in the open after inversion. They will remain in a rather damp and oily condition if protected in a sealed container or package.

The above method permits one to carefully control the size of the granular pesticide formulation, which will governed by the choice of the initial particle sizes for the mineral carrier. No smaller nor larger particles will be produced, so that close control of particle size is easily obtainable. In addition, a uniform coating of the particles is achieved, providing close control of the pesticide distribution and strength.

I have found that the granular pesticide formulation prepared as described above is particularly stable, being capable of maintaining its full weight when stored in a sealed container and resisting the usual tendency of coated carriers to dry out and permit the active pesticide ingredient to be rubbed from the granular material. The resulting product has improved storage capability and resists normal rubbing action during handling for application purposes. I attribute these results to the humidifying effect of the absorbed water and to the sealing of each particle by the inverted oily suspension, which resists any tendency of the water to evaporate from the particles under controlled storage.

It is to be understood that the specific examples given above can be applied to other selected pesticides which are water-insoluble and solid under normal temperatures of storage and use. The kind of oleaginous component used in the preparation of the initial suspension is primarily a matter of choice, and the terms fat and oil are used interchangeably in the description of this method to cover any substance commonly referred to as a fat or oil, whether of animal, vegetable or mineral origin. Furthermore, the choice of an emulsifier is believed to be within the normal skill of one engaged in the field of insecticide preparations, and no particular product or chemical is intended to be singled out by this discussion as being more suitable than others. The important limitation is that a suspension of these pesticides be produced which will be adequately stable to insure its application to the carrier particles, the suspension being sprayed in such a condition that water is the continuous phase of the suspension. The carrier material must be selected so as to be capable of absorbing sufficient water from the sprayed suspension so as to cause the suspension to invert on the carrier particle surfaces.

Having thus described my invention, I claim:

1. A method of producing a granular pesticide formulation from an oleaginous suspension of a solid, water-insoluble pesticide dispersed in a continuous water phase, said method comprising the following steps:

spraying the suspension onto the surfaces of a free-flowing granular water-absorbent carrier substance that is inert to the pesticide and suspension components and that is adequately absorbent to cause the surface suspension sprayed thereon to invert, said spraying being accomplished while subjecting the granular carrier substance to a tumbling action;

and terminatng the tumbling of the granular carrier substance after spraying of the suspension thereon, permitting the sprayed granular carrier substance to cure at rest during absorption of the suspension components, whereby the suspension remaining on the sprayed surfaces of the granular carrier substance inverts.

2. A method as set out in claim 1 wherein the spraying of the suspension is accomplished at as rapid rate as the suspension can be accepted by the granular absorbent carrier substance.

3. A method as set out in claim 1 wherein the spraying of the suspension onto the granular carrier substance is accomplished at as rapid a rate as the suspension can be accepted by the granular carrier substance, the sprayed particles being brought to rest immediately upon completion of the spraying step.

4. A method as set out in claim 1 wherein the suspension is prepared by mixing an oleaginous component in the form of fat or oil of animal, mineral or vegetable origin with an emulsifier and water together with a preselected amount of a solid, water-insoluble pesticide; adding additional water to the suspension so as to make the suspension sprayable.

5. A method as set out in claim 1 wherein the granular absorbent carrier is selected from the group consisting of attapulgite, montmorillonite, diatomite, calcium silicates, precipitated hydrated silicon dioxide, aluminum silicate, kaolin and floridin.

6. A method as set out in claim 1 wherein the oleaginous component of the pesticide suspension comprises not less than one-third the amount of the pesticide by weight and not more than an equal amount by weight of the pesticide in the suspension, the balance of the suspension comprising water plus an amount of commercial emulsifier to form a stable emulsion during spraying and curing of the granular carrier substance.

* * * * *